(12) United States Patent
Davis

(10) Patent No.: US 8,245,847 B2
(45) Date of Patent: Aug. 21, 2012

(54) REUSABLE NESTING AND DENESTING PLASTIC CONTAINER

(76) Inventor: Warren Brent Davis, Springfield, MO (US)

( * ) Notice: Subject to any disclaimer, the term of this patent is extended or adjusted under 35 U.S.C. 154(b) by 907 days.

(21) Appl. No.: 11/745,561

(22) Filed: May 8, 2007

(65) Prior Publication Data
US 2007/0205128 A1    Sep. 6, 2007

Related U.S. Application Data

(63) Continuation-in-part of application No. 11/453,499, filed on Jun. 15, 2006, now Pat. No. 7,837,036.

(60) Provisional application No. 60/702,346, filed on Jul. 25, 2005.

(51) Int. Cl.
*B65D 21/02* (2006.01)

(52) U.S. Cl. .......................... 206/512; 220/623; 220/669

(58) Field of Classification Search .................. 220/308, 220/623, 669, 637, 626, 634, 605, 609, 607, 220/657, 658, 608; 206/503, 512
See application file for complete search history.

(56) References Cited

U.S. PATENT DOCUMENTS

| | | | | |
|---|---|---|---|---|
| 898,931 | A * | 9/1908 | Schaal | 220/324 |
| 3,288,340 | A | 11/1966 | Shapiro et al. | |
| 3,311,257 | A * | 3/1967 | Puente | 206/512 |
| 3,531,013 | A | 9/1970 | Hammes | |
| 3,985,258 | A * | 10/1976 | Quigley et al. | 220/4.28 |
| 4,971,215 | A | 11/1990 | Santoni | |
| D322,032 | S | 12/1991 | Palisin, Jr. | |
| 5,201,437 | A | 4/1993 | Burgdorf | |
| 5,256,051 | A | 10/1993 | Langos et al. | |
| 5,292,024 | A * | 3/1994 | Koefelda et al. | 220/608 |
| D359,150 | S | 6/1995 | Malik et al. | |
| 5,607,075 | A | 3/1997 | Burgdorf et al. | |
| 5,685,452 | A | 11/1997 | Kristoffersson | |
| 5,713,482 | A | 2/1998 | Bordner et al. | |
| 5,785,201 | A | 7/1998 | Bordner et al. | |
| 5,918,757 | A | 7/1999 | Przytulla et al. | |
| 5,947,320 | A | 9/1999 | Bordner et al. | |
| 6,116,500 | A | 9/2000 | Cahill | |
| 6,401,957 | B1 | 6/2002 | Przytulla | |
| 7,216,769 | B2 | 5/2007 | Palder | |
| 2004/0045974 | A1 * | 3/2004 | Gruber et al. | 220/669 |
| 2005/0040068 | A1 | 2/2005 | Palder | |
| 2007/0017920 | A1 | 1/2007 | Davis | |

FOREIGN PATENT DOCUMENTS

| | | |
|---|---|---|
| EP | 0 784 020 A1 | 7/1997 |
| GB | 2 075 462 A | 11/1981 |

* cited by examiner

*Primary Examiner* — Anthony Stashick
*Assistant Examiner* — Jeffrey Allen
(74) *Attorney, Agent, or Firm* — Husch Blackwell LLP

(57) ABSTRACT

The present invention pertains to a plastic container configured to hold food or food related products, including cheese. The container includes upper and lower container walls separated by an integral annular stacking bead and an integral container bottom featuring an exterior side having a plurality of annular and radial reinforcing ribs. The lower container wall features vertical ribs defined by smooth curves that span at least ninety-five percent of the lower container height. The stacking bead is inwardly offset from the upper wall of the container in order to facilitate the nesting of the container within the lower portion of another container and to prevent the containers from being wedged within one another when they are nested. The arrangement of the annular and radial ribs on the exterior side of the container bottom provide increased strength to the container and prevent the container from deforming when filled.

25 Claims, 6 Drawing Sheets

REUSABLE NESTING AND DENESTING PLASTIC CONTAINER

CROSS-REFERENCE TO RELATED APPLICATIONS

This application is a continuation-in-part, and thus claims the benefit of, U.S. patent application Ser. No. 11/453,499 filed on Jun. 15, 2006, which claims the benefit of U.S. Provisional Application No. 60/702,346 filed on Jul. 25, 2005. The entirety of these applications are incorporated by reference as if fully set forth herein.

BACKGROUND OF THE INVENTION

The present invention relates to blow molded plastic containers in which food or food-related products, including cheese, may be stored.

The food industry initially utilized containers made from steel for holding and/or transporting food, especially for holding and/or transporting cheese. Increased weight, cost, the undesirable appearance of rust and other considerations have led many food manufacturers and transporters of food to switch from steel to plastic containers. Small plastic containers are typically injection molded, allowing for greater flexibility in the design and manufacture of the shapes and contours of the containers. Larger, industrial sized containers, on the other hand, are typically blow molded, which encumbers design flexibility. For example, sharp corners and other features may be designed and manufactured via injection molding with relatively few complications by, for example, the use of mold slides and other injection molding tools. The same design features, however, present greater challenges when manufacturing a larger, industrial sized container by blow molding. Thus, many features that would appear straightforward to use in smaller containers are often times deemed not feasible or altogether avoided in the manufacture of larger containers.

The containers must, nonetheless, meet several design criteria while still being hampered by blow molding manufacturing limitations. For example, the containers must be sufficiently durable to withstand forces during transport, such as the pressure from the food or food-related products pushing against the container walls and/or external forces from the containers bouncing or being pushed against a side of a transport vehicle. The containers must also properly store the food and still be sufficiently light for ease of handling.

To be easily stored, lids are removed from the containers, and the containers are nested within one another. But, the internal pressure from the food pushing outward against the container often causes the lower container portions and container bottoms to protrude outward and to permanently deform. The deformation makes it difficult and, in some cases, impossible to nest the containers within one another. Further, the containers must not buckle when subject to compressive forces.

In an attempt to prevent the lower container portions from deforming outwardly, some manufacturers implemented partial external ribbing that covered only about one-quarter of the lower container portion. The partial ribbing showed marginal, if any, benefits to prevent deformation—but the buckling problem and container floor deformation problems persisted.

In addition, because the containers are typically very heavy, especially when containing the food product, individuals typically tilt and roll the containers on a lower rim of the container. The lower rim used on many containers, however, is relatively feeble, having about the same thickness as the container wall. Because of the large forces borne by the lower rim, the lower rim often permanently deforms and, in extreme cases, fractures.

Some steel containers incorporate stacking beads to prevent a top container from sliding all the way within a bottom container in which the top container is nested. The stacking beads, however, are subject to large shear forces from the bottom containers pushing up on the stacking beads of the top containers. Specifically, the shear forces may cause the bead to bend upward or, in extreme cases, fracture. Further, when containers in the art are nested within one another, they often become wedged, making it difficult to denest (separate the containers from one another) the containers. Containers known in the art are also subject to other manufacturing and use problems.

Accordingly, there exists a need for an improved plastic, blow molded container that addresses the shortcomings of the containers now used in the art.

SUMMARY OF THE INVENTION

In one embodiment of the invention, a plastic container is provided for storing food. The container features an upper container portion having an upper container wall and an upper rim that defines a container opening. The container also features a lower container portion having a lower container wall, a container bottom and an extending outer ridge that are integral with one another. The container bottom is axially positioned between the lower container wall and the extending outer ridge. The lower container is defined by a height and features vertical ribs being defined by smooth curves that span at least ninety-five percent of the lower container height. The container of this embodiment additionally includes an annular stacking bead positioned between the upper container portion and the lower container portion in a manner in which the upper portion, annular stacking bead and lower portion are integral with one another. A plurality of raised annular and radial reinforcing ribs are provided on an exterior side of the container bottom which is the side of the container bottom distal the container opening. The radial reinforcing ribs intersect the annular ribs in a plurality of locations.

In another embodiment, a container bottom is provided for a plastic container for storing food. In this embodiment, the container bottom features an extending outer ridge around its periphery, a plurality of raised annular reinforcing ribs provided on an exterior side of the container bottom and a plurality of raised radial reinforcing ribs that intersect the annular ribs in a plurality of locations. In this embodiment, the plurality of annular ribs can feature a first annular rib positioned closest to a center of the container bottom a third annular rib positioned closest to the extending outer ridge and a second annular rib positioned between the first and second annular ribs. In addition, the plurality of radial ribs can include at least one first radial rib extending from the first annular reinforcing rib to the extending outer ridge, at least one second radial rib extending from the first annular reinforcing rib to the second annular reinforcing rib and at least one third radial rib extending from the third annular reinforcing rib to the extending outer ridge.

The reinforcing ribs of the container bottom of this embodiment can be arranged such that the first radial reinforcing ribs are equally spaced from each other around the center of the container bottom. The second and third radial ribs can be arranged in a similar manner. In addition, the arrangement of ribs on the container bottom can feature a formation such that there are twice as many first radial reinforcing ribs as second radial reinforcing ribs and three times as many third radial reinforcing ribs as first radial reinforcing ribs.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
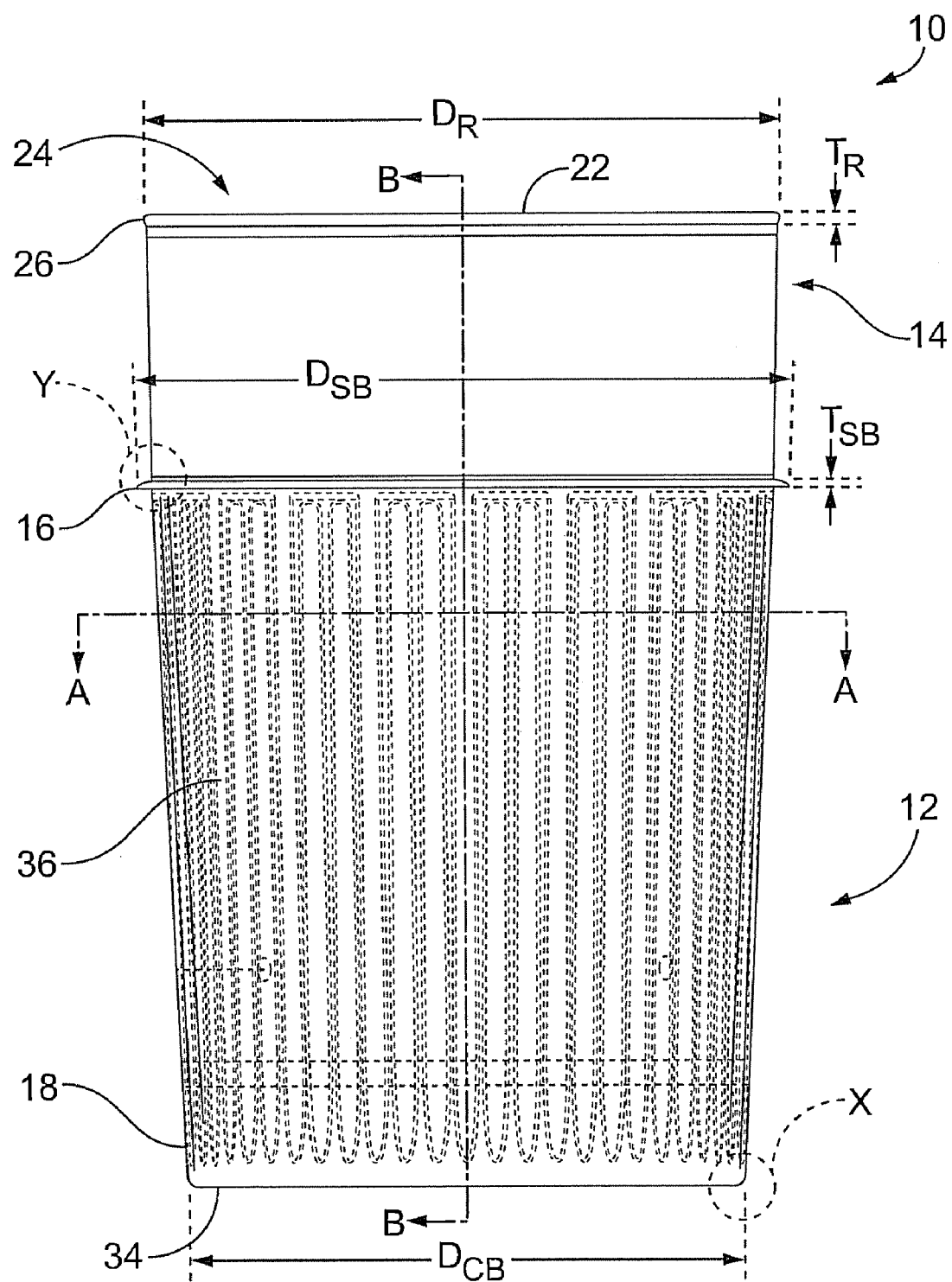
FIG. 1 is a front view of a container incorporating embodiments of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

The present invention pertains to a blow molded plastic container configured to hold food or food-related products, including cheese. Pursuant to one embodiment of the invention, the container includes extended vertical ribs that have a height that spans at least about ninety-five percent of a height of a lower portion of the container. It is believed that the extended ribs prevent buckling of the container.

Pursuant to another embodiment of the present invention, the container includes an extending outer ridge around the periphery of the exterior side of the container bottom. It is believed that the extending outer ridge better absorbs forces when the container is tilted and rolled along the ridge.

Pursuant to further embodiment of the invention, a stacking bead is positioned between the lower and upper container walls, and the lower container wall is inwardly offset from the upper container wall. It is believed that such a configuration reduces the shear stress that the stacking bead is subjected to and, thus, reduces potential deformation and failure of the stacking bead.

Pursuant to yet another embodiment of the invention, the container bottom is reinforced with raised ribbing having an annular and radial orientation. It is believed that the ribbing increases strength and reduces container bottom deformation.

Pursuant to still another embodiment of the invention, the axial plane of the container bottom is positioned such that when the extending outer ridge of the container is placed flat on a floor, the container bottom is spaced from the floor when the container is empty, and does not protrude beyond the bottom of the extending outer ridge when the container is full.

Pursuant to another embodiment of the invention, an area just beneath the stacking ring can have an additional chamfer to permit adaptation to particular configurations of fork lifting equipment or to permit air flow so as to negate the potential for vapor lock holding stacked containers together.

Pursuant to another embodiment of the invention, ribs can extend all the way up to the stacking ring to permit air to flow during nesting and denesting the containers to facilitate air to flow and prevent the formation of too much pressure in the stacked containers that can inhibit stacking, or prevent the formation of too little pressure in the nested containers that may inhibit denesting.

In one embodiment of the invention shown in FIG. 1, the container 10 includes lower and upper container portions 12, 14 that are separated by a stacking bead 16. The lower and upper portions 12, 14 are formed from lower and upper container walls 18, 20, respectively. The upper portion 14 includes an upper rim 22 that defines a container opening 24 and that has a diameter $D_R$, which is about twenty-four inches in a preferred embodiment. The upper rim 22 preferably extends outward from the upper container portion 14 to facilitate nesting. Specifically, the outward extension 26 of the upper rim 22 pushes up against a bottom surface 28 of the stacking bead 16 of a top container 30 (FIGS. 5 & 6) under which a lower container 32 is positioned. In a preferred embodiment, the stacking bead 16 has a diameter $D_{SB}$ of about twenty-four inches, and the upper portion 14 depends straight downward so that the diameter just below the upper rim 22 is substantially the same as the diameter just above the stacking bead 16.

To further facilitate nesting, the lower portion 12 of the container 10 tapers inward so that a diameter of the container bottom $D_{CB}$ has a diameter smaller than the diameter of the upper portion and, in a preferred embodiment, a diameter of about twenty inches.

Figure 3:
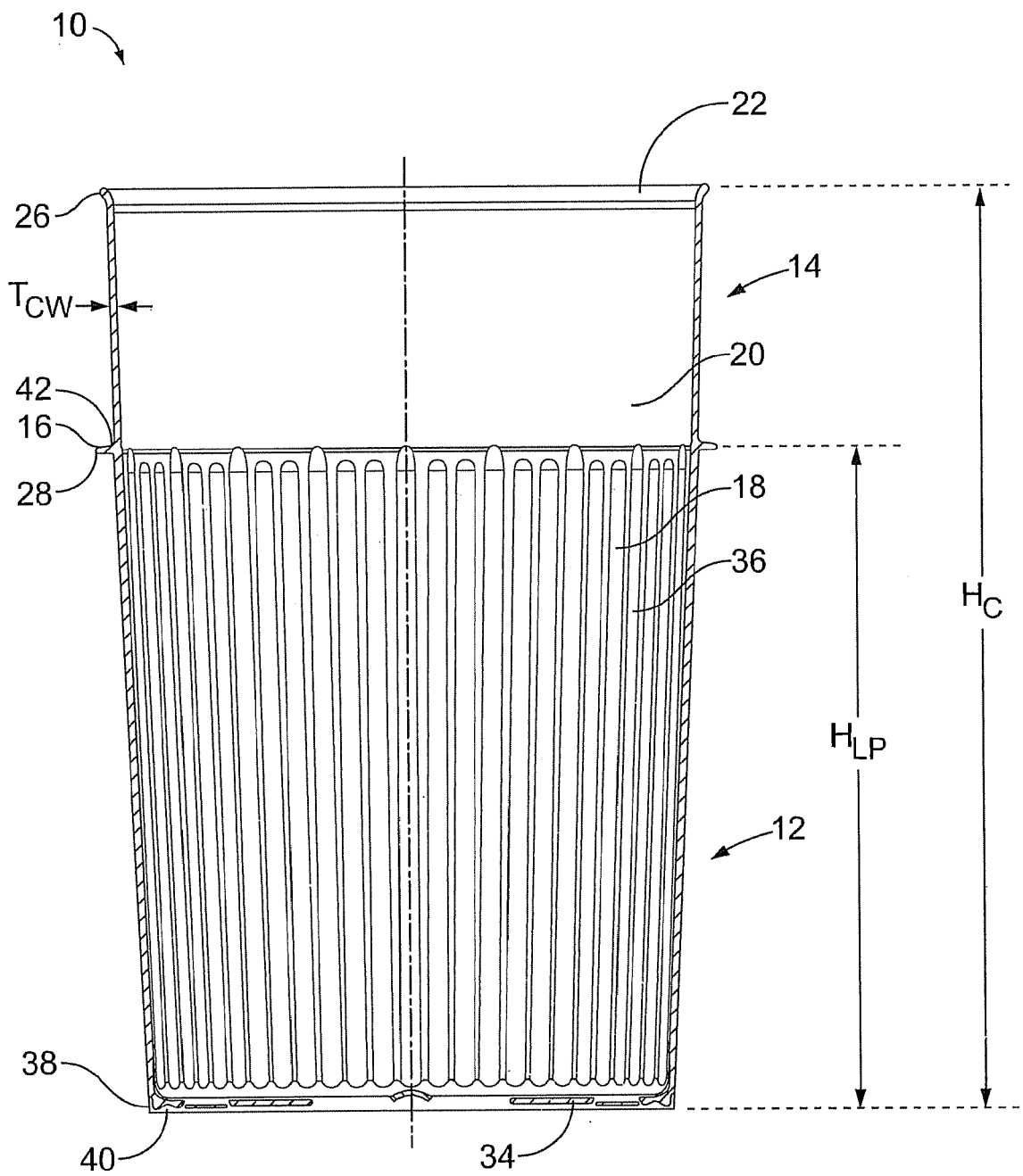
FIG. 3 is a cross-sectional view of the container shown in FIG. 1 along the line B-B.

The container 10 shown in FIGS. 1 and 3 is comprised of a plastic material and, in a preferred embodiment: the container is comprised of high density polyethylene; the height of the container $H_C$ is about thirty-six inches; the height of the lower portion $H_{LP}$ is about twenty-five inches; the thickness $T_R$ of the upper rim 22 is between about one-quarter and three-eighths of an inch; and, the thickness of the stacking bead $T_{SB}$ is between about one-eighth and one-quarter of an inch.

Figure 2:
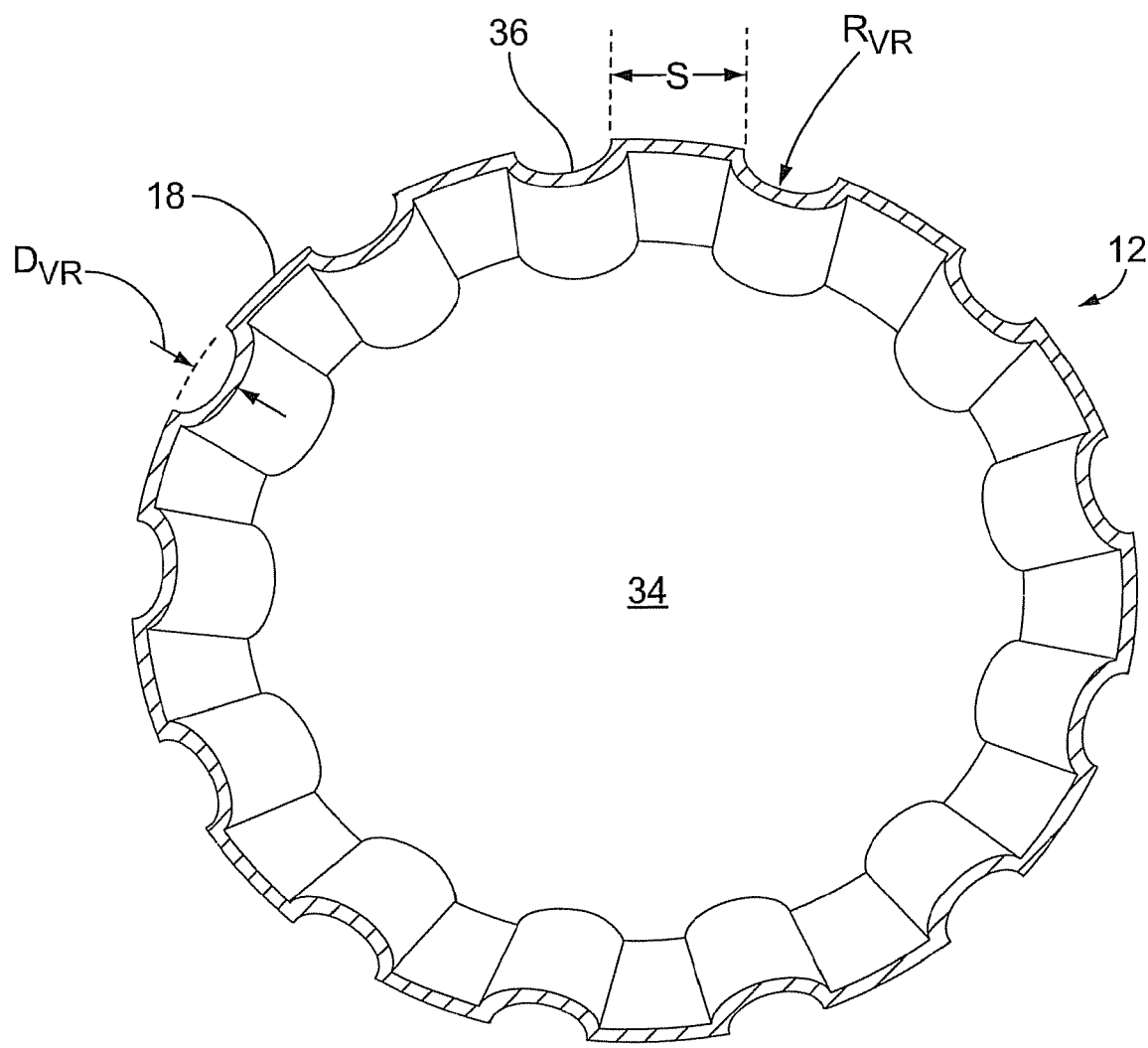
FIG. 2 is a cross-sectional view of the container shown in FIG. 1 along the line A-A.

Pursuant to the first embodiment of the invention shown in FIGS. 1, 2 and 3, extended vertical ribs 36 have a height that is at least about ninety-five percent of the height of the lower container portion H.sub.LP. The ribs 36 are defined by substantially smooth curves and can be defined by, for example, oval type shapes. In an alternative embodiment of the invention the container has one or more air passage vertical ribs that extend all the way up to the bottom surface 28 of the stacking bead 16. In a further alternative embodiment, the extended ribs 36 are defined by substantially semi-circular cross sections.

It is believed that, when known containers are subject to forces, portions of the lower container "panel" and transform from being substantially circular to becoming substantially oval and form flat areas. It is believed that the flat areas lead to unwanted buckling when the containers are subject to compressive forces. The extended vertical ribbing 36 of the first embodiment is believed to prevent paneling and, thus, buckling. Further, it is believed that the ribs 36 allow for increased air flow paths when containers 10 are denested (separated from one another when nested within one another), thus easing the denesting process.

As shown in FIG. 2, the depth of the ribs $D_{VR}$, i.e., the amount the ribs extend into the interior of the container 10, should not be too large in order to avoid problems cleaning the container 10 after food product is removed from the container. Further, there should be a sufficient number of ribs 36 to prevent paneling, and the ribs should be spaced from one another. As shown in FIG. 2, the extended vertical ribs 36 are defined by a radius $R_{VR}$ that is about equal to how far the ribs are spaced S from one another, and the depth of the ribs $D_{VR}$ is about one-quarter of the spacing S distance. In the preferred embodiment, the ribs are defined by a radius of about 0.63 inches.

Figure 4:
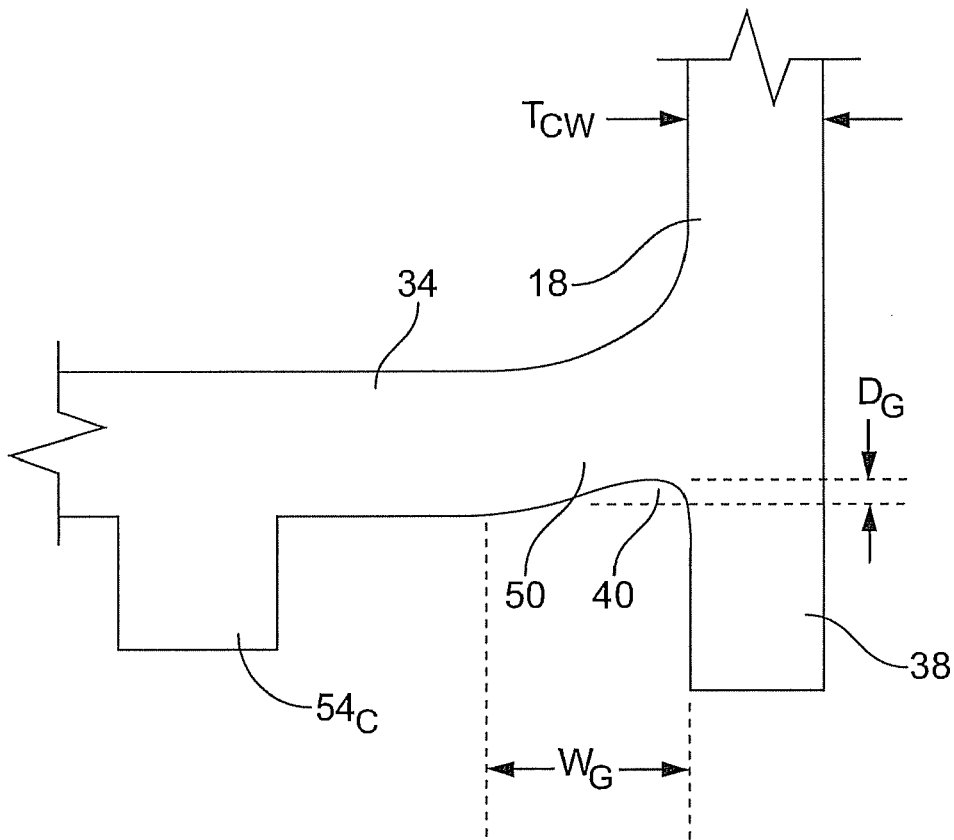
FIG. 4 is a blown up and cross-sectional view of the area shown by the letter X in FIG. 1.

As shown in FIGS. 1 and 4, the lower container wall 18 extends past the container bottom 34 to integrally form an extending outer ridge 38 around the periphery 50 of the exterior side of the container bottom 34 such that the container bottom 34 is axially positioned between the lower container wall 18 and the extending outer ridge 38. In one embodiment, the outer ridge 38 has substantially the same thickness as the lower container wall 18, which is about 0.19 to about 0.25 inches, and extends past the exterior side of the container bottom 34 about 0.20 to 0.30 inches.

As shown in FIG. 4, the peripheral area 50 of the exterior side of the container bottom 34 bends toward the container opening 24 before joining the lower container wall 18 such that a y-shaped configuration is integrally formed between the container bottom 34, lower container wall 18 and extending outer ridge 38. The bending of the container bottom 34 in the peripheral area 50 of the container bottom 34 forms a gap 40 that surrounds the exterior side of the container bottom 34. In one embodiment, the gap 40 has a depth $D_G$ which is about 0.08 inches to about 0.12 inches and a width $W_G$ about 0.25 inches to about 0.35 inches across.

The size, shape and composition of the extending outer ridge 38 and gap 40 allow the container 10 to better withstand the forces that it is subjected to when it is tipped on its side or rolled, when the entire weight of the container is borne by the outer ridge 38. Although the outer ridge 38 and gap 40 shown in FIG. 4 are shown to have a particular size and shape, persons having ordinary skill in the art will understand that these features may have an alternative formation or additional characteristics, including for example, having a different size, shape or composition, without departing from the novel scope of the present invention.

As described above, containers of the invention also incorporate a stacking bead 16 that facilitate denesting and prevent the containers from being wedged within one another when they are nested. Specifically, the stacking bead prevents a top container from sliding all the way into and wedging or being stuck within the lower container in which it is nested.

Figure 5:
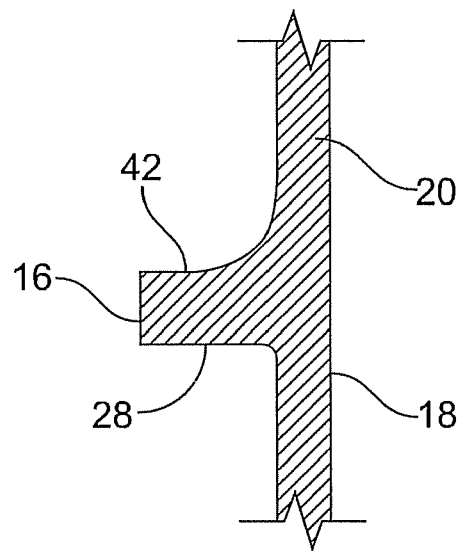
FIG. 5 is a blown up and cross-sectional view of the area shown by the letter Y in FIG. 1.
Figure 6:
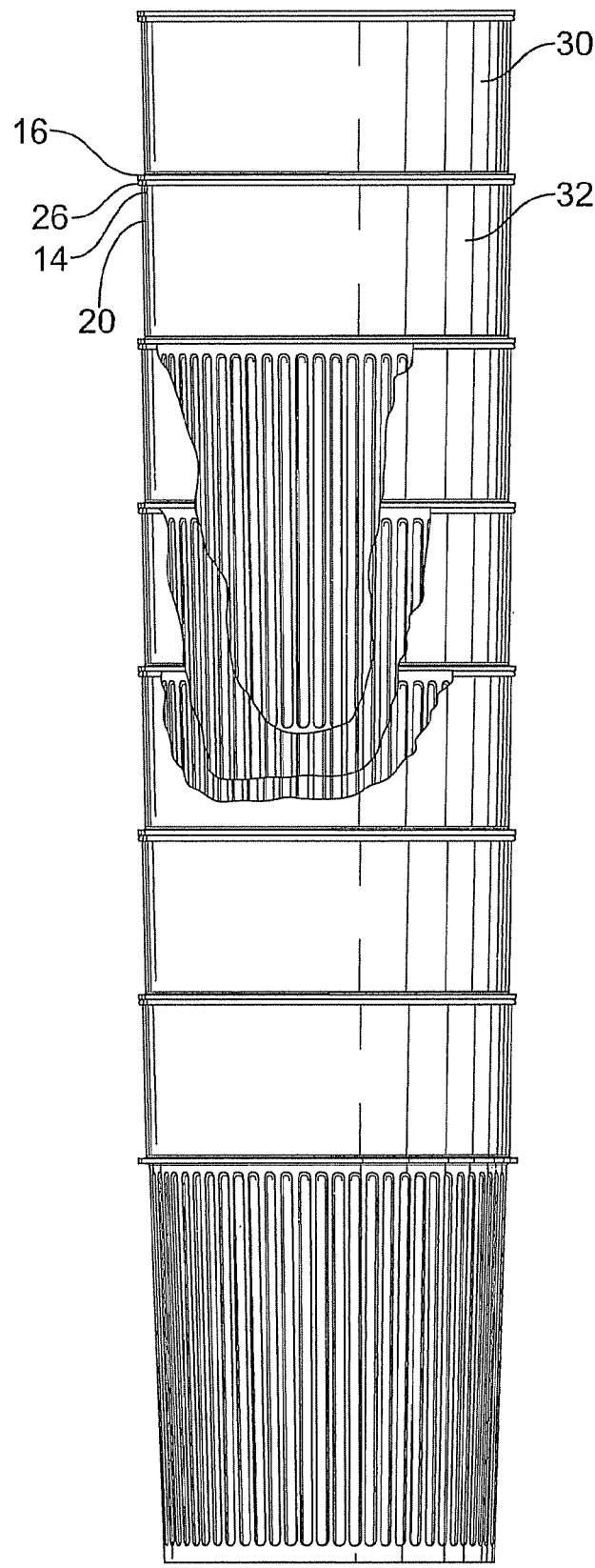
FIG. 6 shows a plurality of containers stacked atop of one another pursuant to embodiments of the invention.

Pursuant to the embodiments of the invention shown in FIGS. 1, 5, and 6 the stacking bead 16 is positioned between the lower and upper container walls 18, 20, and the lower container wall 18 is inwardly offset from the upper container wall 20. A top surface 42 of the stacking bead 16 extends from the upper container wall 20, and the bottom surface 28 of the stacking bead 16 extends from the lower container wall 18 and is longer than the top surface 42 of the stacking bead 16. As a result, when a top container 30 is stacked on top of a lower container 32, the walls of the lower container 18, 20 push up against not only the stacking bead 16 (of the top container 30) but also against the upper container wall 20 of the top container 30. It is believed that such a configuration reduces the shear stress that the stacking bead is subjected to and, thus, reduces potential deformation and failure of the stacking bead.

Figure 7:
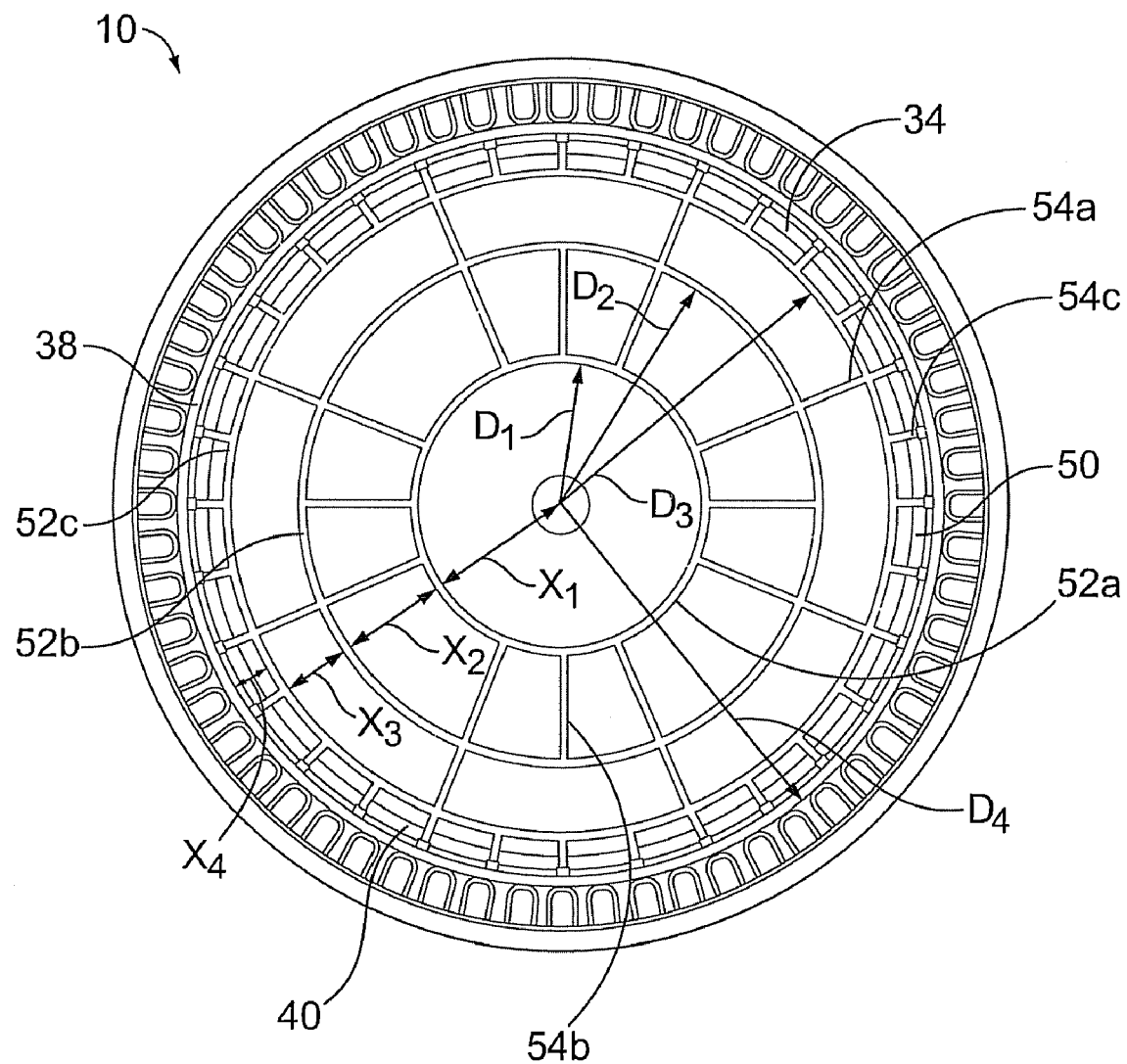
FIG. 7 shows a bottom view of a container bottom pursuant to another embodiment of the invention.

FIG. 7 illustrates the exterior side of a container bottom 34 of one embodiment of container 10 of the present invention. In this embodiment, the exterior side of the container bottom 34 features a plurality of raised annular reinforcing ribs 52a-c and a plurality of raised radial reinforcing ribs 54a-c that intersect the annular ribs 52a-c in a plurality of locations. The use of annular 52 and radial ribs 54 in the arrangement as described herein is shown to provide added strength to the container 10 and specifically prevents the container bottom 34 from deforming in an outward direction by the weight materials housed within the container 10.

As shown in the FIG. 7, each one of the plurality of annular reinforcing ribs 52a-c have a different diameter in relation to the center C of the container bottom. For instance, the first annular rib 52a has a first diameter $D_1$ that is smaller than a second diameter $D_2$ of the second annular rib 52b, and the second diameter $D_2$ of the second annular rib 52b is smaller than a third diameter $D_3$ of the third annular rib 52c. The third diameter $D_3$ of the third annular rib 52c is smaller than a distance $D_4$ between the extending outer ridge and the center C of the container bottom 34. In one embodiment, the annular reinforcing ribs may be arranged such that where $D_1$ is about 3 inches, $D_2$, $D_3$, and $D_4$ will be about 5, 6 and 7 inches respectively. In another embodiment, the annular reinforcing ribs may be arranged such that where $D_1$ is about 14 inches, $D_2$, $D_3$, and $D_4$ will be about 24, 31 and 35 inches respectively.

In one embodiment, the space between successive annular ribs decreases towards the periphery of the container bottom 34. For instance, as shown in FIG. 7, the distance $X_1$ between the center C of the container bottom 34 and the first annular rib 52a is greater than the distance $X_2$ between the first annular rib 52a and the second annular rib 52b. The distance $X_2$ between the first 52a and second 52b annular rib is greater than the distance $X_3$ between the second 52b and third 52c annular rib, and the distance $X_3$ between the second 52b and third annular rib 52c is greater than the distance $X_4$ between the third annular rib 52c and the extending outer ridge 38.

In one embodiment of the present invention, the radial reinforcing ribs 54 that intersect the annular ribs 52 can vary in length. As shown in FIG. 7, radial reinforcing ribs 54 can extend from the first annular reinforcing rib 52a to the extending outer ridge 38 of the container 10, or may be shorter and only extend from the first annular rib 52a to the second annular rib 52b. In addition, the exterior side of the container bottom 34 can feature radial ribs 54c extending from the third annular rib 52c to the extending raised ridge 38.

While FIG. 7 shows the annular and radial reinforcing ribs 52, 54 to have a specific pattern, the illustrated formation merely represents one particular embodiment of the present invention. Persons of ordinary skill in the art will thus understand that other formations may be used without departing from the novel scope of the invention. As shown in FIG. 7, the container bottom can feature an arrangement such that there are twice as many first radial reinforcing ribs 54a as second radial reinforcing ribs 54b and three times as many third radial reinforcing ribs 54c as first radial reinforcing ribs 54a. The container bottom 34 in FIG. 7 illustrates such an arrangement by showing a formation having 4 second radial reinforcing ribs 54b, 8 first radial reinforcing ribs 54a and 24 third radial reinforcing ribs 54c. In addition, the radial reinforcing ribs 54 can be arranged around the center C of the container bottom 34 such that the first radial reinforcing ribs 54a are equally spaced from one another, the second radial reinforcing ribs 54b are equally spaced from one another and the third radial reinforcing ribs 54c are equally spaced from one another.

The size and shape of the annular and radial reinforcing ribs 52, 54 on the exterior side of a container bottom 34 may be consistent or may vary according to their location with respect to the center C of the container bottom 34. The size and shape of the annular 52 and radial 54 ribs may vary from container to container as well. In one embodiment, each one of the plurality of the raised annular and radial reinforcing ribs 52, 54 has a width between 0.05 and 0.50 inches and a height between 0.05 and 0.50 inches in relation to the exterior side of the container bottom 34.

In other embodiments, the annular and radial ribs 52, 54 towards the periphery 50 of the container bottom 34 may have a greater height than those proximate to the center C in order to account for a small amount of displacement at the center portion of the container bottom 34 when the container 10 is filled. In this embodiment, the ribs 52, 54 on the container bottom 34 will all be substantially in the same horizontal plane when the container 10 is filled. The raised extending ridge 38 may also have a greater height than the annular or radial reinforcing ribs 52, 54 for the same reason.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention.

What is claimed is:

1. A plastic container for storing food, the container comprising:
   an upper container portion having an upper container wall and an upper rim that defines a container opening;
   a lower container portion having a lower container wall, a container bottom and an extending outer ridge, wherein the lower container wall, container bottom and extending outer ridge are integral with one another, the container bottom being axially positioned between the lower container wall and the extending outer ridge, the lower container portion being defined by a height more than a height of the upper container wall and having vertical ribs formed thereon, the vertical ribs spanning at least ninety-five percent of the lower container height and having a lower end spaced from the container bottom and the outer ridge;
   an annular stacking bead axially positioned between the upper container portion and the lower container portion, wherein the upper portion, stacking bead and lower portion are integral with one another;
   said ribs being a first plurality of ribs and a second plurality of ribs,
   said first plurality of ribs terminating at an upper end spaced from the stacking bead,
   said second plurality of ribs having an upper end contacting the stacking bead, with each of the second plurality of ribs laterally widening between the stacking bead and the upper end of said first plurality of ribs; and
   a plurality of raised reinforcing ribs provided on the exterior side of the container bottom.

2. The plastic container of claim 1, wherein the plurality of reinforcing ribs are concentric: each reinforcing rib joined to at least one other reinforcing rib by at least one of the plurality of radial reinforcing ribs.

3. The plastic container of claim 1, wherein each one of the plurality of raised reinforcing ribs has a width between 0.05 and 0.50 inches.

4. The plastic container of claim 1, wherein each one of the plurality of raised reinforcing ribs has a height between 0.05 and 0.50 inches in relation to the exterior side of the container bottom.

5. The plastic container of claim 1, wherein the extending outer ridge has a greater height than each one of the plurality of reinforcing ribs.

6. The plastic container of claim 1, wherein a peripheral area of the container bottom bends towards the container opening before joining the lower container wall such that a y-shaped configuration is formed between the container bottom, lower container wall and extending outer ridge, the y-shaped configuration forming a gap around the peripheral area of the container bottom between the exterior side of the container bottom and the extending outer ridge.

7. The plastic container of claim 1, wherein the first plurality of vertical ribs are spaced from one another by a distance and are defined by a semi-circular cross-sectional shape being defined by a radius, the radius being substantially the same as the distance between the first plurality of vertical ribs.

8. The plastic container of claim 1, wherein the stacking bead further comprises a bottom surface and a top surface, wherein a top portion of the lower container wall is inwardly offset from a lower portion of the upper container wall so that, when the container is stacked on top of a lower container, a lower container rim pushes against both the stacking bead and the upper container portion of the container.

9. The plastic container of claim 1, wherein the lower container portion tapers inward such that the container bottom has a diameter that is smaller than the diameter of the upper container portion.

10. The plastic container of claim 2, wherein at least one of the plurality of reinforcing ribs is a first radial rib extending from a first annular reinforcing rib to the extending outer ridge.

11. The plastic container of claim 1, wherein, the plurality of reinforcing ribs are equally spaced from one another around the center of the container bottom.

12. A plastic container for storing food, the container comprising:
   a cylindrical exterior;
   a stacking bead on a midsection of the cylindrical exterior;
   vertical ribs;
   a container bottom having an extending outer ridge of substantially the same diameter as the container bottom around a periphery of the container bottom:
   a plurality of raised annular reinforcing ribs provided on an exterior side of the container bottom, the exterior side of the container bottom being positioned distal a container opening at an opposing end of the container;
   a plurality of raised radial reinforcing ribs provided on the exterior side of the container bottom, radiating from a flat circular central area the radial reinforcing ribs intersecting the annular ribs in a plurality of locations, and
   said vertical ribs being a first plurality of ribs and a second plurality of ribs,
   said first plurality of ribs terminating at an upper end spaced form the stacking bead,
   said second plurality of ribs having an upper end contacting the stacking bead, with each of the second plurality of ribs laterally widening between the stacking bead and the upper end of said first plurality of ribs.

13. The plastic container-of claim 12, wherein the plurality of annular reinforcing ribs comprise:
a first annular rib having a first diameter in relation to a center of the container bottom;
a second annular rib having a second diameter in relation to the center of the container bottom; and
a third annular rib having a third diameter in relation to the center of the container bottom;
wherein the first diameter is smaller than the second diameter, the second diameter is smaller than the third diameter and the third diameter is smaller than a distance between the extending outer ridge and the center of the container bottom;
each annular rib joined to at least one other annular rib by at least one of the plurality of radial reinforcing ribs.

14. The plastic container of claim 12, wherein each one of the plurality of raised annular and radial reinforcing ribs has a width between 0.05 and 0.50 inches.

15. The plastic container of claim 12, wherein each one of the plurality of raised annular and radial reinforcing ribs has a height between 0.05 and 0.50 inches in relation to the exterior side of the container bottom.

16. The plastic container of claim 12, wherein the extending outer ridge has a greater height than each one of the plurality of annular reinforcing ribs.

17. The plastic container of claim 12, wherein a peripheral area of the container bottom bends towards the container opening before joining a container side wall such that a y-shaped configuration is formed between the container bottom, lower container wall and extending outer ridge, the y-shaped configuration forming a gap around the peripheral area of the container bottom between the exterior side of the container bottom and the extending outer ridge.

18. The plastic container of claim 12, wherein at least one of the plurality of radial reinforcing ribs is a first radial rib extending from the first annular reinforcing rib to the extending outer ridge.

19. The plastic container of claim 12, wherein the plurality of radial reinforcing ribs comprise:
at least one first radial rib extending from the first annular reinforcing rib to the extending outer ridge;
at least one second radial rib extending from the first annular reinforcing rib to the second annular reinforcing rib; and
at least one third radial rib extending from the third annular reinforcing rib to the extending outer ridge.

20. The plastic container of claim 13, wherein the first annular rib is a first distance away from the center of the container bottom, the second annular rib is a second distance away from the first annular rib, the third annular rib is a third distance away from the second annular rib;
wherein the first distance is greater than the second distance, the second distance is greater than the third distance and the third distance is greater than a distance between the third annular rib and the extending outer ridge.

21. The plastic container of claim 13, wherein the first annular reinforcing rib has a height that is smaller than the third annular reinforcing rib.

22. The plastic container of claim 13 wherein, there are twice as many first radial reinforcing ribs than second radial reinforcing ribs, and there are three times as many third radial reinforcing ribs than first radial reinforcing ribs.

23. The plastic container of claim 21, wherein, the first radial reinforcing ribs are equally spaced from one another around the center of the container bottom, the second radial reinforcing ribs are equally spaced from one another around the center of the container bottom, and the third radial reinforcing ribs are equally spaced from one another around the center of the container bottom.

24. The plastic container of claim 1 further including,
a plurality of raised radial reinforcing ribs provided on the exterior side of the container bottom, and
a plurality of annular reinforcing ribs provided on an exterior side of the container bottom while a flat center, the exterior side of the container bottom is positioned distal the container opening.

25. A plastic container for storing food, the container comprising:
an upper container portion having an upper container wall and an upper rim that defines a container opening;
a lower container portion having a lower container wall,
the lower container portion having vertical ribs formed thereon,
an annular stacking bead axially positioned between the upper container portion and the lower container portion, wherein the upper portion, stacking bead and lower portion are integral with one another;
said ribs being a first plurality of ribs and a second plurality of ribs,
said first plurality of ribs terminating at an upper end spaced from the stacking bead,
said second plurality of ribs having an upper end contacting the stacking bead, with each of the second plurality of ribs laterally widening between the stacking bead and the upper end of said first plurality of ribs.

* * * * *